United States Patent Office 2,803,327
Patented Aug. 20, 1957

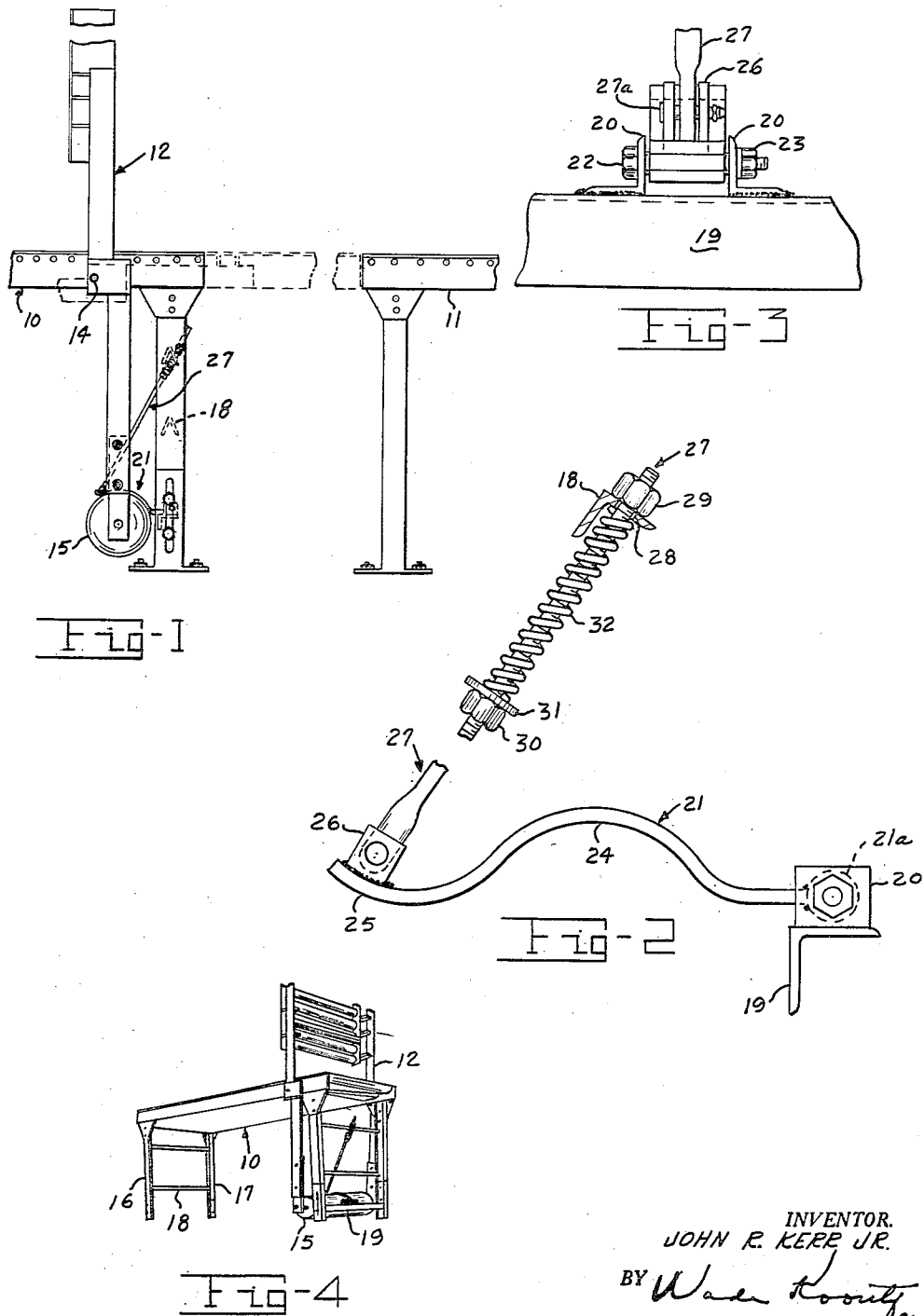

2,803,327

AUTOMATIC LOCKS FOR CONVEYOR GATES

John R. Kerr, Jr., Carlisle, Pa., assignor to the United States of America as represented by the Secretary of the Air Force Application July 6, 1955, Serial No. 520,382

3 Claims. (Cl. 193—35)

(Granted under Title 35, U. S. Code (1952), sec. 266)

The invention described herein may be manufactured and used by or for the United States Government for governmental purposes without payment to me of any royalty thereon.

This invention relates to a locking device and, more particularly, to a locking device for a roller conveyor gate.

Gates are provided in roller or belt conveyor systems to permit a section of the conveyor to be elevated whereby persons or vehicles may pass through the passage provided in the conveyor by the elevated gate when it is in an upright or elevated position. After persons or vehicles have passed through the passage, the gate is lowered to again form an uninterrupted conveyor. The conveyor gate is pivoted to its elevated position by a counterbalance weight on the end that is lowermost when the gate is in its elevated position and has previously depended on this weight to maintain the gate in its elevated position. However, this counterbalance weight does not lock the gate in the elevated position and these gates sometimes inadvertently drop from their elevated positions causing injury to persons or damage to property in the passage at that time. The present invention satisfactorily solves this problem by providing a locking device that secures the gate in its elevated or upright position.

The primary object of this invention is to provide an apparatus that locks the pivoted section of a roller or belt conveyor in its upright position.

Other objects of this invention will be readily perceived from the following description.

This invention relates to a combination including a roller conveyor comprising sections having a transverse gap forming a passageway therebetween. A gate section is pivotally mounted between the sections to bridge the gap to form a continuous roller conveyor. One end of the pivoted gate section has a weight thereon to move the section to its upright position and means cooperate with the weight to lock the pivoted section in its upright position.

The attached drawing illustrates a preferred embodiment of the invention, in which:

Fig. 1 is a side elevational view of a portion of a roller conveyor including the present invention;

Fig. 2 is a side elevational view of the locking apparatus of the present invention;

Fig. 3 is an end elevational view of a portion of the device shown in Fig. 2; and Fig. 4 is a perspective view of a portion of a roller conveyor showing the present invention locking the pivoted section in its upright position.

Referring to the drawing, there is shown a roller conveyor including sections 10 and 11 spaced apart to provide a gap or passage therebetween that is normally closed by the gate section 12. The gate section in its closed position is shown in dotted lines in Fig. 1. The gate section 12 is pivoted on the section 10 of the roller conveyor by suitable means 14 such as a bolt. A counterbalance roller or weight 15 is mounted on one end of the gate section 12 so that the gate section may be elevated to an upright position. It will be understood that the gate section 12 is held in its closed position by suitable well-known locking means, which are not shown since they do not form a part of the present invention. One type of such locking means is shown in the patent to F. A. Rider, No. 1,418,024, issued May 30, 1922.

A pair of base legs 16 and 17 is disposed at each end of the conveyor sections 10 and 11 to support these sections. Each pair of gate legs 16 and 17 is joined together by angle bars 18, two of which are shown but more could be employed, if desired. An angle member 19 is connected to one of the pairs of base legs 16 and 17 (see Fig. 4) below the angle bars 18.

The locking apparatus of this invention is supported mainly by the angle member 19. A pair of angle supports 20 having apertures therein is secured to the angle member 19 by suitable means such as welding. One end of a lock arm 21 has an enlarged portion 21a with an aperture therein. The lock arm 21 is pivotally connected to the angle supports 20 by means of a bolt 22 and a nut 23 passing through the apertures in the supports 20 and the portion 21a through other suitable securing means may be employed, if desired. The lock arm 21 is shown in its non-locking position in Fig. 2 and includes an arcuate shaped holding portion 24 and a curved guiding portion 25. A U-shaped lock rod support 26 is secured to the curving guiding portion 25 of the lock arm 21 preferably by welding. A lock rod 27 is pivotally connected to the support 26 by suitable means 27a such as a flat head pin and a cotter pin, for example. The other end of the lock rod 27 passes through an aperture 28 in the angle bar 18; the aperture 28 is preferably formed in the uppermost angle bar 18. The uppermost portion of the lock rod 27 is provided with threads whereby a nut 29 is threaded thereon to limit downward movement of the lock rod 27. A second nut 30 is threaded a distance from the nut 29 (see Fig. 2) and has a washer 31 disposed thereabove. The washer 31 cooperates with the angle bar 18 to hold a spring 32 therebetween to bias the lock arm 21 downwardly, against the roller 15 when it is disposed in the portion 24.

When the gate section 12 is pivoted to the upright position shown in Figs. 1 and 4, the counterbalance roller 15 rides on the curved guiding portion 25 of the lock arm 21 into the arcuate shaped holding portion 24. Obviously, as the roller 15 passes beneath the portion 25 the spring 32 is compressed by the upward movement of the lock rod 27 and the washer 31 thereon. Once the roller is disposed within the portion 24 (see Figs. 1 and 4), the spring 32 expands to exert a downward force on the lock arm 21 to hold the gate 12 in its upright position and prevent any accidental displacement from this position. To return the gate section 12 to its closed position (the dotted line position of Fig. 1) wherein a continuous roller conveyor is provided, it is only necessary to pull on the roller 15 whereby the force of the roller 15 on the lock arm 21 moves the lock rod 27 upwards. This compresses the spring 32 so that its force on the lock arm 21 is overcome and the roller is released from its locking position.

It will be readily understood that adjustment is necessary for each locking device cooperating with each of the pivoted gate sections 12 to produce the proper tension of the spring 32 for opening and closing the pivoted gate section 12. This is accomplished by movement of either the nut 29 or nut 30 or both.

An advantage of this invention is that pivoted sections of continuous roller conveyors are prevented from accidentally falling from an upright position to cause injury to persons or damage to property.

For purposes of exemplification, a particular embodiment of the invention has been shown and described according to the best present understanding thereof. However, it will be apparent that changes and modifications in the arrangement and construction of the parts thereof may be resorted to without departing from the true spirit or scope of the invention.

I claim:

1. In combination, a roller conveyor comprising sections having a transverse gap forming a passageway therebetween, a pair of cooperating base legs supporting each end of each of said conveyor sections, a gate section pivotally mounted between said sections to bridge the gap to form a continuous roller conveyor, a weight on one end of said pivoted section to move said section to an upright position, and a spring biased lock arm supported between one of said pairs of said legs cooperating with said weight to lock said pivoted section in its upright position.

2. In combination, a roller conveyor comprising sections having a transverse gap forming a passageway therebetween, a pair of cooperating base legs supporting each end of each of said conveyor sections, a gate section pivotally mounted between said sections to bridge the gap to form a continuous roller conveyor, a weight on one end of said pivoted section to move said section to an upright position, an angle member mounted between one of said pairs of said legs, a lock arm pivotally mounted on said angle member, and spring biasing means connected between said arm and said one pair of said legs whereby said lock arm cooperates with said weight to lock said pivoted section in its upright position.

3. In combination, a roller conveyor comprising sections having a transverse gap forming a passageway therebetween, a pair of cooperating base legs supporting each end of each of said conveyor sections, a gate section pivotally mounted between said sections to bridge the gap to form a continuous roller conveyor, a weight on one end of said pivoted section to move said section to an upright position, each of said pairs of said legs being joined together by angle bars, an angle member connected to each leg of one of said pairs of said legs, an angle support secured to said angle member, a lock arm pivotally connected to said angle support, and spring means connected at one end to one of said angle bars and pivotally connected at its other end to the free end of the lock arm whereby the lock arm is urged against the weight to lock said pivoted section in its upright position.

References Cited in the file of this patent
UNITED STATES PATENTS

| 270,736 | Burnett et al. | Jan. 16, 1883 |
| 639,710 | Cherry | Dec. 26, 1899 |
| 730,922 | Johnson | June 16, 1903 |
| 1,418,024 | Rider | May 30, 1922 |